United States Patent [19]

Yoder

[11] Patent Number: 4,908,224

[45] Date of Patent: Mar. 13, 1990

[54] PROCESS FOR DEBITTERING SOYBEAN GRIT

[76] Inventor: Lois Yoder, 1121 Columbia Rd., NW., Washington, D.C. 20009

[21] Appl. No.: 931,961

[22] Filed: Nov. 17, 1986

Related U.S. Application Data

[63] Continuation of Ser. No. 432,389, Sep. 30, 1982, abandoned.

[51] Int. Cl.<sup>4</sup> ............................................. A23L 1/20
[52] U.S. Cl. ................... 426/634; 426/431; 426/460; 426/507
[58] Field of Search .............. 426/622, 425, 431, 456, 426/459, 460, 486, 507, 634

[56] References Cited

U.S. PATENT DOCUMENTS

| | | | |
|---|---|---|---|
| 3,126,286 | 3/1964 | Moshy | 426/634 |
| 3,912,824 | 10/1975 | Spiel | 426/431 |

*Primary Examiner*—George Yeung
*Attorney, Agent, or Firm*—Lowe, Price, LeBlanc, Becker & Shur

[57] ABSTRACT

A method of and products resulting from treating soy grits to remove bitter flavor therefrom and to provide an instantaneously edible fluffy and neutral soy food product, by the use of a special combination of controlled scalding, soaking, heating and rinsing using only water treatment are disclosed. The debittered soy food product can be used immediately in recipes, or can be dried by heating followed by grinding to obtain a dry, debittered edible soy product of sandy or flour texture, depending upon the desired final use of the product. By adding water to the dried, debittered product, the reconstituted moist, fluffy soy product is ready for immediate use in a variety of recipes to provide a high protein, nutritious, soy food.

13 Claims, No Drawings

PROCESS FOR DEBITTERING SOYBEAN GRIT

This application is a continuation of application Ser. No. 432,389, filed Sept. 30, 1982, now abandoned.

TECHNICAL FIELD

This invention relates generally to soybean processing and, more particularly, to a process for debittering soybean grit, to remove their objectionable flavor, followed by, if desired, drying and grinding to a desired consistency.

BACKGROUND ART

Soybeans are one of the richest natural food sources of protein known today. Because of their high protein nutritional value, and they can satisfy the protein requirements for all age groups. Present economic conditions worldwide have prompted an increased concern for producing more protein on available land; thus, the production of soybeans as a low cost alternative usable protein source is increasing.

In spite of their high protein content, soybeans as naturally found are not a delectable food for humans because of their bitter flavor, high density and, inter alia, the presence of trypsin inhibitors preventing protein digestion. Although worldwide demand is increasing, especially in third world nations, domestic utilization of soybeans is somewhat limited because of these objectionable natural characteristics. Thus, agriprocessors are confronted with problems relating to providing soybeans with desirable physical and taste characteristics suitable for application to a wide variety of foods.

Various attempts are known to prevent development of the soybeans bitter off flavor. One such attempt is disclosed in U.S. Pat. No. 3,594,185 to Hawley et al., wherein complete soybeans (i.e. whole soybeans with the hulls intact enclosing the cotyledons) are subjected to dry heating at high temperatures to initiate hull cracking, followed by immersion of the beans in water to remove the hulls and thereafter boiling for approximately fifteen to twenty minutes to remove the bitter flavor. While this prior method may be successful to dehull and remove bitter flavor from whole beans, the requirement of dry heating, then boiling treatment in a water bath for the above time interval is relatively expensive from the standpoint of energy consumption. More importantly, however, the resulting moist product, as occurs after water bath treatment or by debittering with other prior art methods, does not appear ready for immediate consumer use; further processing is necessary to adequately texturize the whole bean, such as roasting and grinding so that the soybeans can be mixed with other ingredients, forming commercially available soy-based food products, often quite expensive to the consumer.

Another problem which appears to limit widespread use of soybeans is the absence for retail sale of basic debittereed soy material (i.e. consisting basically of soy without added ingredients) intended for direct use by consumers in their own recipes. For dietary or personal reasons, consumers often desire to use the soybean in their recipes. However, to my knowledge soybeans or soybean grits as presently available for retain sale are not debittered, limiting their popularity in recipes. If basic debittered soy products were available to the public without having been previously processed into other foods, either for retail sale or for home preparation using relatively inexpensive store-bought undebittered soy, this inventor believes that consumer demand for soybeans would greatly increase.

SUMMARY OF THE INVENTION

Accordingly, an object of the present invention is to provide a new and improved method for debittering soybean grit which can be effected in a simple and economical manner during commercial soybean processing or in the home.

Another object of the invention is to provide a method which produces a debittered, fluffy soy product from soy grit for direct use in recipes for soy based foods.

A further object of the invention is to provide a method which appears to enhance the nutritional protein value of the soybean during the debittering process.

Still another object is to provide a product prepared by the method of the present invention which can be dried by heating, reducing its weight and volume, for cost-effective shipping and prolonged storage, and can thereafter be reconstituted into a fluffy soy food product simply by adding water.

Yet another object is to provide additional process steps to render the dry, debittered soy product of the invention into a granular or flour consistency for different end uses.

In accordance with the present invention, soybean grit material is initially scalded in boiling water and then allowed to soak to initiate removal of certain bitter flavor constituents while pre-softening the grit. After straining and rinsing the soak water from the grit, the softened and partially debittered grit mixture is boiled in a second water bath treatment for a short period of time and rinsed again to substantially entirely remove the bitter flavor constituents from the grit. After draining, the moist product is light and fluffy. The resulting product can be combined directly with other food ingredients to produce a wide variety of soy based food products without requiring additional processing.

Another aspect of the invention involves exposing the debittered, moist soybean grit to dry heat, to produce a dry, lightweight and debittered soy material, which can be reconstituted into the moist product simply by the addition of water for direct use in recipes. The dried soy grit can then be ground, if desired, to obtain a dry, debittered edible soy product of sandy or flour texture, depending upon the desired final use of the product.

DESCRIPTION OF THE PREFERRED EMBODIMENT

For a better understanding of the present invention, reference is made to the following description.

The starting material to which the present method is directed is soybean grit, which is obtained by cracking and dehulling cleaned whole soybeans, followed by flaking; the flakes are then defatted with a solvent (e.g. hexane) to extract soybean oil for other uses. After removing the solvent, the soy flakes are toasted to increase their protein efficiency by deactivating enzymes present in raw soybeans that inhibit protein digestion. The flakes are then milled and sized into soy flour and soy bean grit, with the grits typically having a particle size larger than 100 mesh, U.S. Standard Sieve Size. A list of commercially available forms of defatted soy grits may be found in "Defatted Soy Flour and Grits", Richard L. Kellor, Journal of American Oil Chemists' Society, January 1974 (Vol. 51), the disclosure of which is incorporated herein by reference.

Thus, as the term is used herein, soybean grit means a product obtained from milling defatted soybeans, into coarse, medium or fine grit size pieces in accordance with the above process steps which are well known in the art. Because of certain bitter flavor constituents, the characteristic taste of soybean grits includes an undesirable bitter flavor which is objectionable to most people.

In the present method, the soybean grit is initially scalded by immersion in water preheated to boiling temperature to facilitate osmotic leaching out of constituents causing bitter flavor. The grit is left to soak in the water. The time of soaking may vary from about ten minutes to forty-five minutes. While soaking from ten to twenty minutes is sufficient to initiate debittering and to provide satisfactory results, to subsequently obtain a completely debittered product as described hereinbelow, through experimentation I have found that a soaking time of about forty-five minutes is most desirable from the standpoint of initially softening the soybean grit to subsequently obtain a fluffy as well as debittered product which is more palatable. In the soaking step, the soybean grit is added to a sufficient quantity of boiling water (e.g. a ratio of one cup of grits to four cups of water) so that the grits absorb approximately 25–50 percent of the water content. After initially preheating the water to boiling, no further heating is required for the duration of the soaking period. During the soak, the grit begins to swell and the soak water stains as bitter flavor constituents are released from the grit.

After initial soak water treatment, for best results the grit is then strained in a wire strainer or similar means to allow the bitter stained soak water to drain thoroughly from the grit. After straining the foul smelling soak water from the grit, the grit is rinsed with fresh water until the rinse water becomes clear.

To completely debitter the wet grit and produce a moist, fluffy product, the soak is followed by boiling in a second water bath treatment. Preferably, one part of pre-soaked grit (by volume) is added to three to four parts of fresh water, which can be tap water. Heat is applied to gradually raise the water bath to boiling temperature. Boiling them occurs for a short period of time, from approximately three to ten minutes, with five minutes being normally sufficient. This short boiling period neutralizes the bitter flavor constituents in the soybean grit without destroying the high protein value.

The grit is then removed from the boiling water, placed into a strainer and rinsed thoroughly with fresh water to remove the stained boil water from the grit. To drain excess rinse water from the cooked grit, which is important from the standpoint of proper storage, the grit may then be poured and completely wrapped into a dry cloth or towel or similar means. As the cloth is twisted and wrung gently but firmly, the grit particles will pack against each other, causing excess water to be drained therefrom.

The resulting soybean grit product, when removed from the water bath or after draining, generally includes each individual grit particle intact, which now have an appealing nature, an essentially neutral taste and fluffy texture, generally free of the objectionable bitter flavor constituents. The resulting product is no longer high in density; instead, it is light and fluffy, ready for immediate consumption or other uses, discussed below.

While the above method produces a fluffy debittered product which is essentially odorless and tasteless, I have found that a second scald with boiling water, as above, followed by a five to fifteen minute soak, quick rinse and reboiling with water for about one minute, then another rinse and drain as above, will produce a completely odorless and tasteless product.

According to the unique method, supra, the moist soy grit product is ready for immediate consumer use since it is now debittered, fluffy and generally neutral to the palate, in contrast to previous ground processed or home prepared soy products. With proper refrigeration to keep the product moist, it can be stored for up to five to ten days before consumption. Freezing further extends the life of the product. In any event, I have found that if any objectionable product odor is present after extended storage, it can be reheated to neutralize the odor to provide a fresh taste and smell.

The moist, debittered soy product obtained in accordance with the above method is unique in view of its debittered and fluffy nature, economical and easy preparation either by commercial processors or the individual consumer, and its direct use in either commercially or home prepared foods, to be described hereinafter.

To facilitate other uses of the moist, debittered soy product obtained with the above method, it can be dried by dry heating to remove its moisture, resulting in a dry debittered soy product which is lightweight and can be stored indefinitely. To uniformly and completely dry the moist product, it is preferred to spread the same into a uniform layer so that approximately two cups of the moist, debittered product cover a 10 inch by 15 inch area, such as a cookie sheet. Dry heating is effected in an oven at a temperature of approximately 250° F. for approximately sixty to seventy-five minutes. To ensure even drying, the product can be stirred periodically (e.g. three times during the heating period).

The resulting dry debittered soy product, after water removal is effected by heating, is approximately one fourth of its previous volume. The debittered soy grit particles are tasteless, highly nutritious and because of their light weight, are economical to ship and store indefinitely. The dry product can be easily reconstituted into its former moist and fluffy condition simply by adding three parts of boiling water (by volume) to one part of the dry product.

When the moist, debittered soy product prepared using the method of the invention is dried by heating, as aforesaid, grinding the dry mixture to a desired consistency may be easily carried out, depending on the desired end use of the debittered soy product. For example, during home preparation, the dry debittered soy material may be placed within a commercially available food mill or blender and ground to a desired consistency. By grinding the soy in a food blender (e.g. Osterizer Galaxie blender, No. 869-14H) at high speed setting for approximately one to two minutes, the dry debittered grit particles can be rendered into a grainy or sandy texture for direct use in frappes and the like. The resulting debittered granular product is also desirable for use in baked products. Further grinding of the dry mixture for approximately three to five minutes renders the same into a flour consistency for direct use in other products. Of course, the granular and flour textured debittered soy material prepared with the method of the invention can be reconstituted by adding three parts of boiling water to one part of dry mixture to obtain a moist product.

A few illustrative examples of the process are as follows:

EXAMPLE I

Undebittered soybean grit (1 cup), manufactured by Fearn Soya Foods, Melrose Park, Ill., was scalded in 4 cups of water and left to soak for about forty-five minutes, causing some of the objectionable bitter flavor constituents to leach from the grit particles into the soak water. The grits, after straining and rinsing with fresh tap water, were put into a fresh water bath in a four quart kettle so that the resulting mixture was approximately one part (1 cup) of grits (by volume) to four parts (4 cups) of water. The mixture was boiled for five minutes, causing some of the water to be absorbed while effecting osmotic leaching of the undesirable bitter flavor constituents into the residual water. The moist soy product was then strained from the residual water, rinsed with fresh water and drained to produce a fluffy, debittered soy product capable of immediate use. For example, one such use was obtained by combining the moist debittered soy product with a nut meal, such as almonds or cashews, in equal parts, and beating the same with a wire whisk for approximately thirty seconds. Dried fruits, margarine and spices were thoroughly mixed with the meal and moist soy product to produce a delicious crumb pie crust and other sweets. Beverages, such as milk shakes and ice cream, were also made by mixing the moist debittered soy product with other suitable ingredients in a blender. A delicious spread was made by mixing equal parts with apple butter.

EXAMPLE II

Soybean grit was treated as in Example I. Two cups of the moist product was spread into an even layer in a 10×15 inch pan and then dried by heating at approximately 250° F. for about sixty to seventy-five minutes to produce a dry debittered product. The dried product was one fourth its moist volume and was able to be reconstituted by adding three parts by volume of boiling water to one part by volume of dry product to obtain the moist fluffy product in Example I. The dried product was lightweight and convenient to store. When reconstituted the debittered moist product was once again fluffy and bland. Breads, crackers, vegetable and cheese main and side dishes, soups and cereals were made by mixing the dried soy product with other food ingredients.

EXAMPLE III

The dried debittered soy material prepared as in Example II was ground into a grainy or sandy consistency with a Varco Electric Grinder (Model 228.1.00) for approximately one to two seconds. The resulting debittered granular soy was used in baking as a flour substitute to produce light, not heavy, baked products. Further grinding of the dry granular soy material into a flour consistency for approximately three to five minutes rendered the same available for direct use in other recipes.

Many other examples could be set forth, but since the noted examples and the teachings herein are sufficient for one having ordinary skill in the art to practice the invention, additional examples would only be superfluous. It is conceivable that the conceptual method herein can be practiced in various ways, including debittering of full fat (i.e. non-defatted) soybean grit, by both commercial processors and individual consumers alike, within the criteria set forth to produce debittered soy products which are directly usable without further processing; hence, the invention is intended to be limited only by the definitions provided in the attached claims and the reasonable equivalents thereto.

I claim:

1. A method of debittering soybean grit to form a useable and edible, moist and fluffy soybean food product comprising the steps of: initially preheating a water bath consisting essentially of water to about boiling temperature; scalding and soaking a predetermined quantity of soybean grit by immersion in said water bath for a sufficient time interval to obtain absorption of approximately 25 to 50 percent of the water by the grit thereby initiating removal of bitter flavor constituents and causing swelling of the soybean grit without further heating of said water bath during said predetermined time interval after said initial preheating occurs; thoroughly straining the grit from the soak water and rinsing the wet grit with fresh water; rapidly heating the wet grit in a second water bath consisting essentially of water at temperatures at least equal to boiling temperature for a sufficient time period to substantially entirely remove bitter flavor constituents from the grit; and then removing the grit from the second water bath to rinse and drain the same.

2. The method of claim 1, wherein said grit is soaked for approximately ten minutes to forty-five minutes, and boiled for approximately three to six minutes.

3. An edible soy food product prepared according to the method of claim 1.

4. The method of claim 1, comprising the further steps of spreading the rinsed and drained grit on a surface into a thin layer, and applying dry heat to the grit at a temperature of about 250° F. for a predetermined time duration to remove most of the moisture from the grit, forming a dry, debittered edible soy food product.

5. The method of claim 4, wherein said predetermined time duration is about sixty to seventy-five minutes.

6. An edible soy food product prepared according to the method of claim 4.

7. The method of claim 4, comprising the further step of grinding the dry soy food product in a blender or food mill for a specified timer interval.

8. The method of claim 7 wherein said specified time interval is about one to two seconds and grinding is performed in a food mill.

9. A soy food product prepared according to the method of claim 7, said product being of granular or sandy consistency.

10. The method of claim 7, wherein said specified time interval is sufficient to grind the product into a flour consistency.

11. A soy food flour product prepared according to the method of claim 10.

12. The method of claim 1, comprising the further steps of initially preheating a third water bath to about boiling temperature and scalding and soaking the wet grit by immersion in said third water bath for approximately 5 to 10 minutes without further heating said third water bath during said soaking after said initial preheating occurs; thoroughly straining the grit from the soak water of the third water bath and rinsing the wet grit with fresh water; rapidly heating the wet grit in a fourth water bath at boiling temperature for approximately 1 minute; and then removing the grit from the fourth water bath to rinse and drain same.

13. The method of claim 1, wherein said soybean grit, prior to scalding and soaking in the first water bath, is initially in uncooked form.

* * * * *